(12) United States Patent
Turner

(10) Patent No.: US 9,876,529 B2
(45) Date of Patent: Jan. 23, 2018

(54) GLOBAL NAVIGATION SATELLITE SYSTEM

(71) Applicant: AIRBUS DEFENCE AND SPACE LIMITED, Hertfordshire (GB)

(72) Inventor: Michael Charles Turner, Hertfordshire (GB)

(73) Assignee: AIRBUS DEFENCE AND SPACE LIMITED, Hertfordshire (GB)

( * ) Notice: Subject to any disclaimer, the term of this patent is extended or adjusted under 35 U.S.C. 154(b) by 0 days.

(21) Appl. No.: 14/411,812

(22) PCT Filed: May 31, 2013

(86) PCT No.: PCT/EP2013/061297
§ 371 (c)(1),
(2) Date: Dec. 29, 2014

(87) PCT Pub. No.: WO2014/001021
PCT Pub. Date: Jan. 3, 2014

(65) Prior Publication Data
US 2015/0171917 A1 Jun. 18, 2015

(30) Foreign Application Priority Data

Jun. 27, 2012 (EP) .................................... 12275100

(51) Int. Cl.
*G01S 19/21* (2010.01)
*H04B 1/707* (2011.01)
*H04B 7/185* (2006.01)

(52) U.S. Cl.
CPC ............ *H04B 1/707* (2013.01); *G01S 19/215* (2013.01); *H04B 7/18523* (2013.01)

(58) Field of Classification Search
CPC ........ G01S 19/215; G01S 19/05; G01S 19/21; G01S 19/25; G01S 19/32; H04B 7/18523
See application file for complete search history.

(56) References Cited

U.S. PATENT DOCUMENTS 5,825,887 A * 10/1998 Lennen ........................... 380/34
6,522,635 B1 * 2/2003 Bedwell ............. H04B 7/18528
370/314

(Continued)

OTHER PUBLICATIONS

Pozzobon et al., "Anti-Spoofing and Open GNSS Signal Authentication With Signal Authentication Sequences", Dec. 2010, 5th ESA Workshop on Satellite Navigation Technologies and European Workshop on GNSS Signals and Signal Processing (NAVITEC), 6 pages.*

(Continued)

*Primary Examiner* — David B. Lugo
(74) *Attorney, Agent, or Firm* — Scarinci & Hollenbeck

(57) ABSTRACT

A method and apparatus for providing information about an encrypted signal transmitted by a satellite in a satellite navigation system are disclosed. A data sequence of the encrypted signal as transmitted is obtained, a signal sample is extracted from the data sequence, the signal sample including a part of the data sequence having a length less than a total length of the data sequence, and the signal sample and information about when the data included in the signal sample was transmitted by the satellite are transmitted, as the encrypted signal information, to a receiver for use in the satellite navigation system. A method and apparatus for authenticating an unencrypted signal based on the encrypted signal information are also disclosed. In particular, a time offset between an internal clock of the receiver and an internal clock of the satellite is obtained based on the unencrypted signal, the encrypted signal information is received, a portion of the received encrypted signal is identified that is expected to correspond to the signal sample based on the obtained time offset, the identified portion is correlated with the signal sample, and it is determined that the received unencrypted signal is authentic if a predetermined threshold correlation is obtained.

17 Claims, 6 Drawing Sheets

(56) References Cited

U.S. PATENT DOCUMENTS

| | | | |
|---|---|---|---|
| 2005/0146459 A1* | 7/2005 | Dentinger et al. | 342/357.01 |
| 2007/0194984 A1* | 8/2007 | Waid | 342/357.02 |
| 2009/0195443 A1* | 8/2009 | Levin et al. | 342/352 |
| 2010/0127918 A1* | 5/2010 | Vadlamani | G01S 19/23 342/357.62 |
| 2012/0121087 A1* | 5/2012 | Psiaki | 380/255 |
| 2013/0176168 A1* | 7/2013 | Lo | G01S 19/47 342/357.3 |

OTHER PUBLICATIONS

Office Action in Chinese Patent Application No. 2013800345284, dated Oct. 19, 2016.

* cited by examiner

GLOBAL NAVIGATION SATELLITE SYSTEM

FIELD OF THE INVENTION

The present invention relates to satellite navigation systems. In particular, the present invention relates to providing a sample of an encrypted signal transmitted by a satellite in a satellite navigation system, receiving the sample at a receiver, and correlating the sample with a received encrypted signal to authenticate an unencrypted signal received from the satellite.

BACKGROUND OF THE INVENTION

Global Navigation Satellite Systems (GNSSs) such as the Global Positioning System (GPS) are used in a wide range of application to provide accurate positioning data for a receiver located on or near the Earth's surface. The receiver receives navigation signals from a plurality of satellites and performs trilateration to determine its location coordinates. Specifically, each received signal includes information about the time at which the signal was transmitted. By measuring the time at which the signal is received, the distance travelled by the signal can be calculated.

Satellite navigation systems commonly include a plurality of services for use by different groups of users. For example, a high-accuracy service may be provided for use by authorised groups of users, such as the emergency services and the military, whilst a lower-accuracy service may be made available for public use by any person with a compatible receiver. High-accuracy services employ signal encryption to prevent unauthorised users from obtaining high-accuracy position fixes, whereas low-accuracy services are provided through unencrypted positioning signals that can be received and processed by any commercially available receiver. However, because the low-accuracy service is unencrypted, a receiver cannot verify whether the signals being received are coming from a trusted source. Therefore users of the low-accuracy service are particularly vulnerable to malicious activities such as spoofing, in which an attacker broadcasts a high-power GNSS-like signal with false timing information to fool the receiver into calculating an incorrect position, and meaconing, in which an attacker rebroadcasts authentic GNSS signals to obtain a similar effect. There is therefore a need for a method to allow a receiver to authenticate a received unencrypted signal, to determine whether the signal can be trusted.

The invention is made in this context.

SUMMARY OF THE INVENTION

According to the present invention, there is provided a method for providing encrypted signal information about an encrypted signal transmitted by a satellite in a satellite navigation system, the method comprising obtaining a data sequence of the encrypted signal as transmitted, extracting a signal sample from the data sequence, the signal sample including a part of the data sequence having a length less than a total length of the data sequence, the signal sample comprising a plurality of sub-samples each including a separate part of the data sequence such that the data sequence is discontinuous between consecutive ones of the plurality of sub-samples, and transmitting, to a receiver for use in the satellite navigation system, the signal sample and information about when the data included in the signal sample was transmitted by the satellite, as the encrypted signal information.

The encrypted signal information may include a plurality of signal samples each extracted from a different one of a plurality of encrypted signals, each one of the encrypted signals being transmitted by a different satellite in the satellite navigation system.

Each encrypted signal may be transmitted as a sequence of chips, the encrypted signal information may include information about encrypted signal chips transmitted by M satellites in the satellite navigation system, and the number of chips N in the part of the data sequence included in the signal sample may be given by $N \leq M-1$.

The sequence of chips may be a pseudorandom number PRN sequence modulated by a data bit, and if one of the sub-samples includes a data bit transition, the length N of said sub-sample in chips may be given by $N \leq 2(M-1)$.

The method may further comprise validating each signal sample before transmitting to the receiver, by detecting the transmitted encrypted signal, identifying a portion of the detected encrypted signal corresponding to the signal sample, correlating the identified portion of the detected encrypted signal with the signal sample, and validating the signal sample if a predetermined threshold correlation is obtained.

The data sequence of the encrypted signal may be obtained by directly detecting the encrypted signal transmitted by the satellite. Here, by data sequence it is meant the transmitted sequence of encrypted chips, which for example in the Galileo GNSS are obtained by modulating pseudo-random number (PRN) code chips with a data bit, transmitted by the satellite. The encrypted signal may, for example, be detected using a high gain directional antenna.

The data sequence of the encrypted signal may be obtained based on information about pseudorandom number PRN codes and data used by the satellite to generate the encrypted signal.

According to the present invention, there is also provided a method for authenticating an unencrypted signal at a receiver arranged to receive the unencrypted signal and an encrypted signal from a satellite in a satellite navigation system, the method comprising obtaining a time offset between an internal clock of the receiver and an internal clock of the satellite based on the unencrypted signal, receiving encrypted signal information about the encrypted signal, the encrypted signal information including a signal sample and information about when data included in the signal sample was transmitted by the satellite, the signal sample comprising a plurality of sub-samples each including a separate part of the data sequence such that the data sequence is discontinuous between consecutive ones of the plurality of sub-samples, identifying a portion of the received encrypted signal expected to correspond to the signal sample based on the obtained time offset, correlating the identified portion with the signal sample, and determining that the received unencrypted signal is authentic if a predetermined threshold correlation is obtained.

The encrypted and unencrypted signals may be received at the same frequency, and may be phase-locked.

The received encrypted signal may be modulated according to a Binary Offset Carrier BOC modulation scheme, and the method may further comprise applying the BOC modulation to the signal sample, wherein correlating the identified portion with the signal sample comprises correlating the identified portion with the BOC modulated signal sample.

A computer-readable storage medium can be arranged to store a computer program which, when executed, performs the method.

According to the present invention, there is further provided apparatus for providing encrypted signal information about an encrypted signal transmitted by a satellite in a satellite navigation system, the apparatus comprising means for obtaining a data sequence of the encrypted signal as transmitted, means for extracting a signal sample from the data sequence, the signal sample including a part of the data sequence having a length less than a total length of the data sequence, the signal sample comprising a plurality of sub-samples each including a separate part of the data sequence such that the data sequence is discontinuous between consecutive ones of the plurality of sub-samples, and means for transmitting, to a receiver for use in the satellite navigation system, the signal sample and information about when the data included in the signal sample was transmitted by the satellite, as the encrypted signal information.

The means for extracting the signal sample from the data sequence may be arranged to extract a signal sample comprising a plurality of sub-samples, each sub-sample including a separate part of the data sequence.

The means for extracting the signal sample from the data sequence may be arranged to extract a plurality of signal samples each extracted from a different one of a plurality of encrypted signals, each one of the encrypted signals being transmitted by a different satellite in the satellite navigation system, and the means for transmitting may be arranged to transmit the plurality of signal samples as the encrypted signal information.

Each encrypted signal may be transmitted as a sequence of chips, the encrypted signal information may include information about encrypted signal chips transmitted by M satellites in the satellite navigation system, and the means for extracting the signal sample may be arranged to extract a part of the data sequence of length N chips for each signal sample, wherein N is given by $N \leq M-1$.

The sequence of chips may be a pseudorandom number PRN sequence modulated by a data bit, and if one of the sub-samples includes a data bit transition, the length N of said sub-sample in chips may be given by $N \leq 2(M-1)$.

The means for obtaining the data sequence of the encrypted signal may be arranged to obtain the data sequence by directly detecting the encrypted signal transmitted by the satellite.

The means for obtaining the data sequence of the encrypted signal may be arranged to obtain the data sequence based on information about pseudorandom number PRN codes and data used by the satellite to generate the encrypted signal.

According to the present invention, there is further provided a receiver arranged to receive the unencrypted signal and an encrypted signal from a satellite in a satellite navigation system, the receiver comprising means for obtaining a time offset between an internal clock of the receiver and an internal clock of the satellite based on the unencrypted signal, means for receiving encrypted signal information about the encrypted signal, the encrypted signal information including a signal sample and information about when data included in the signal sample was transmitted by the satellite, the signal sample comprising a plurality of sub-samples each including a separate part of the data sequence such that the data sequence is discontinuous between consecutive ones of the plurality of sub-samples, and means for determining whether the received unencrypted signal is authentic, said means for determining being arranged to identify a portion of the received encrypted signal expected to correspond to the signal sample based on the obtained time offset, correlate the identified portion with the signal sample, and determine that the received unencrypted signal is authentic if a predetermined threshold correlation is obtained.

The receiver may be arranged to receive the encrypted and unencrypted signals as phase-locked signals at the same frequency.

The received encrypted signal may be modulated according to a Binary Offset Carrier BOC modulation scheme, and the means for determining whether the received unencrypted signal is authentic may be arranged to apply the BOC modulation to the signal sample and correlate the identified portion with the BOC modulated signal sample.

A system can be provided comprising the apparatus and the receiver.

The system may further comprise validation means for validating each signal sample before the signal sample is transmitted to the receiver, the validation means being arranged to detect the transmitted encrypted signal, identify a portion of the detected encrypted signal corresponding to the signal sample, correlate the identified portion of the detected encrypted signal with the signal sample, and validate the signal sample if a predetermined threshold correlation is obtained.

The satellite navigation system may be the Galileo navigation system, the unencrypted signal may be an Open Service signal and the encrypted signal may be a Public Regulated Service signal.

BRIEF DESCRIPTION OF THE DRAWINGS

Embodiments of the present invention will now be described, by way of example only, with reference to the accompanying drawings, in which.

DETAILED DESCRIPTION

Figure 1:
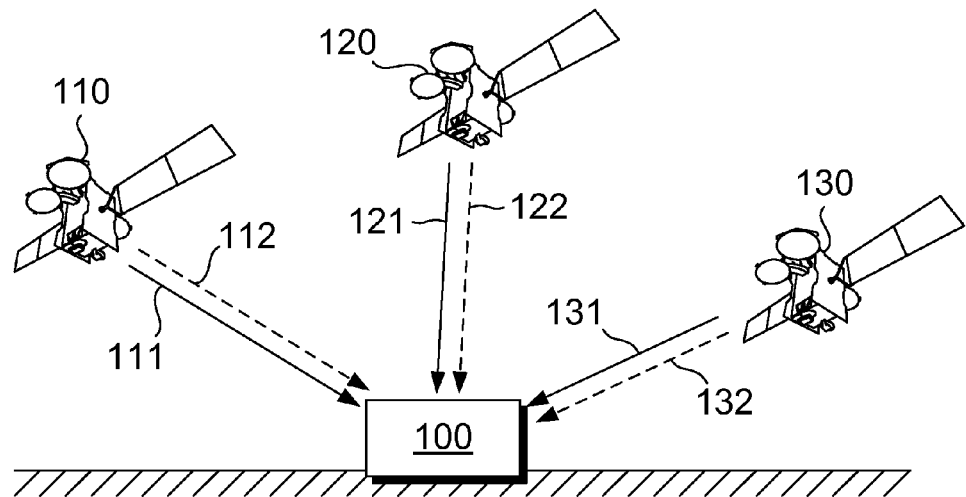
FIG. 1 illustrates a satellite navigation system according to an embodiment of the present invention.

Referring now to FIG. 1, a satellite navigation system is illustrated according to an embodiment of the present invention. In the present embodiment the satellite navigation system is the Galileo navigation system, in which a high-accuracy Public Regulated Service (PRS) is provided through encrypted positioning signals transmitted from the satellites, whilst a low-accuracy Open Service (OS) is provided through unencrypted positioning signals transmitted from the satellites. Hereinafter, embodiments of the present invention will be described in relation to PRS and OS signals received by a receiver for use in the Galileo GNSS. However, in general embodiments of the present invention can be applied in any satellite navigation system in which satellites transmit both encrypted and unencrypted positioning signals.

The system comprises a receiver 100 and a plurality of satellites 110, 120, 130 arranged to transmit positioning signals that can be received by the receiver 100. Each satellite 110, 120, 130 is arranged to transmit an unencrypted OS signal 111, 121, 131, shown as solid arrows in FIG. 1, and an encrypted PRS signal 112, 122, 132, shown as dashed arrows in FIG. 1. The receiver 100 is able to receive both the unencrypted signals 111, 121, 131 and the encrypted signals 112, 122, 132. However, the receiver 100 is not authorised to access the high-accuracy PRS positioning data in the encrypted signals 112, 122, 132, and hence does not have access to the necessary security keys to decrypt the received encrypted signals 112, 122, 132. Therefore the receiver 100 can only understand the unencrypted OS signals 111, 121, 131 and cannot access positioning information, for example pseudorange measurement, ephemeris data or timing information, in the encrypted PRS signals 112, 122, 132.

Nevertheless, in embodiments of the present invention a receiver is able to use an encrypted signal to authenticate an unencrypted signal received from the same satellite, even though the receiver cannot understand the encrypted signal. In the Galileo system, each satellite is arranged to transmit the unencrypted OS signal and the encrypted PRS signal in the same frequency band and the OS and PRS signals are phase-locked. As such, a third party can spoof the OS signal without transmitting their own PRS signal phase-locked with the spoof OS signal. However, the PRS signal cannot be spoofed without access to the system keys used to encrypt the signals. Therefore in embodiments of the present invention, a receiver is arranged to authenticate a received unencrypted signal if the encrypted signal from the same satellite is deemed to be authentic. In particular, embodiments of the present invention enable the receiver to determine whether the encrypted signal is authentic without having to decrypt the signal, hence the receiver does not require access to the system encryption keys.

It should be noted that although in the present embodiment the unencrypted signals and encrypted signals are transmitted phase-locked at the same carrier frequency, the present invention is not limited to this arrangement. Encrypted and unencrypted signals are commonly transmitted in this manner to simplify amplification and transmission of the signals by the satellite. For example, the GPS also transmits encrypted and unencrypted signals at the same carrier frequency. However, in other embodiments the encrypted and unencrypted signals could be transmitted at different carrier frequencies, or in a different frequency band.

In more detail, to determine whether a received encrypted signal is authentic the receiver 100 is arranged to obtain encrypted signal information about the encrypted signal from a trusted security provider. The encrypted signal information includes a signal sample from the transmitted encrypted signal along with information about when the data included in the signal sample was transmitted by the satellite. The receiver 100 can use this information to identify a portion of the received encrypted signal that would be expected to correspond to the data in the signal sample, assuming that the encrypted PRS signal is authentic and that a time offset obtained from the unencrypted signal is correct. A high correlation indicates that the PRS signal is authentic. If it is determined that the encrypted PRS signal is authentic, the receiver wo determines that the unencrypted OS signal received from that satellite is also authentic and that the time offset is correct.

The encrypted signal information will now be described in more detail with reference to FIG. 2, which illustrates a signal sample extracted from an encrypted signal according to an embodiment of the present invention. In the present embodiment the encrypted signal is one of the Galileo PRS signals 112 received by the receiver 100 of FIG. 1. In the Galileo GNSS, PRS signals are transmitted using a code-division multiple access (CDMA) method, specifically binary offset carrier (BOC) modulation. However, in other GNSSs different modulation schemes may be used when transmitting an encrypted signal, and the present invention is not limited only to BOC modulation. In general, embodiments of the present invention can be used in any CDMA-based system.

Figure 2:
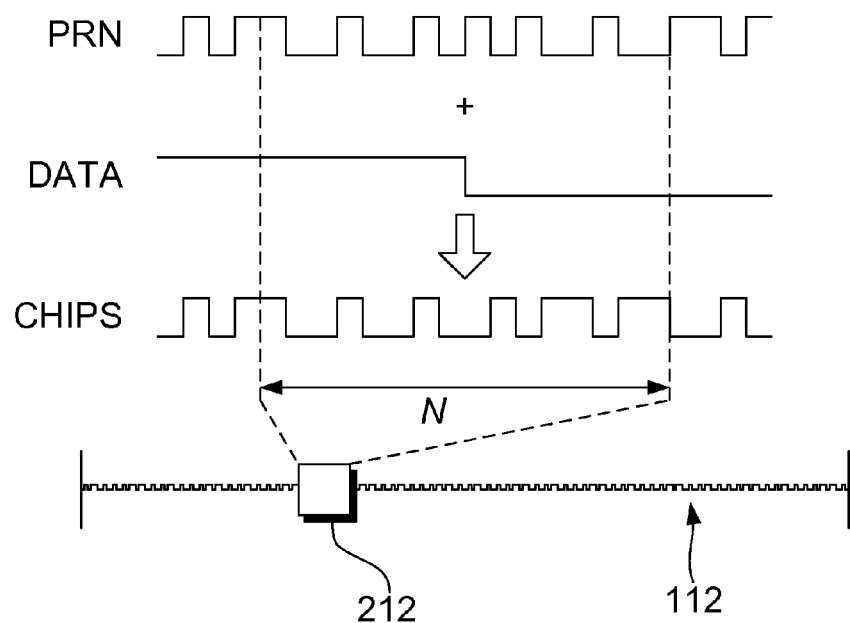
FIG. 2 illustrates a signal sample extracted from an encrypted signal, according to an embodiment of the present invention.

As shown in FIG. 2, in the present embodiment the encrypted signal 112 is received as a sequence of chips, i.e. rectangular pulses of amplitude +1 or −1. The receiver 100 stores the received encrypted signal 112 for correlation with the encrypted signal information. The encrypted signal information includes a signal sample 212 which is an extract of the data sequence transmitted in the encrypted signal 112. The signal sample 212 includes part of the sequence of PRS chips as-transmitted. The PRS chips to be transmitted are obtained by the satellite by modulating a pseudorandom number (PRN) unique to the satellite with a data bit. Specifically, the PRN data is used as the PRS chips, but is inverted whenever there is a data bit transition. The encrypted signal information provided to the receiver only includes the PRS chips and does not include the PRN or data bits. Preferably, each signal sample is chosen to span a data transition as shown in the present embodiment, but this is not essential. Therefore the security of the original encrypted signal is maintained because the signal sample 212 cannot be decomposed to give the constituent PRN sequence or data bit of any of the GNSS satellites. Further security is provided since only a part of the data sequence of the encrypted signal 112 is provided to the receiver, and the signal sample 212 is only supplied to the receiver after the satellite has transmitted the encrypted signal 212, to prevent the GNSS signal from being spoofed.

Also, the encrypted signal information includes information about a time at which the data included in the signal sample 212 was transmitted by the satellite. The signal sample 212 has a length of N chips, and can be correlated with a corresponding portion of the received encrypted signal 112 by the receiver to determine whether the received encrypted signal is authentic and whether a time offset obtained based on received unencrypted signals is correct.

In more detail, the receiver first obtains a time offset between an internal clock of the receiver and an internal clock of the satellite. In a GNSS, the satellite internal clocks are synchronised to the GNSS system time, whereas the receiver only includes a relatively inaccurate clock to keep cost and complexity to a minimum. Therefore when calculating a position fix, a GNSS receiver also has to obtain a time offset between its own internal clock and the satellite internal clocks. To correlate the received encrypted signal 112 with the signal sample 212, the receiver has to identify a portion of the received encrypted signal 112 that would be expected to correspond to the signal sample if the PRS signal is authentic and the time offset is correct. The receiver can use the obtained time offset, information about when each part of the encrypted signal was received, and information about when the data in the signal sample 212 was transmitted to identify the portion of the received encrypted signal.

If the obtained time offset is correct, and if the encrypted signal 112 is authentic, then there will be a strong correlation between the identified portion of the received encrypted signal 112 and the signal sample 212. Therefore a high correlation indicates that the time offset is correct, and consequently the unencrypted OS signal must be authentic, otherwise the obtained time offset would not allow a strong PRS correlation with the signal sample. Here, the receiver 100 may authenticate the unencrypted signal if a predetermined threshold correlation value is obtained.

In the present embodiment, a signal sample 212 is illustrated which includes a single part of the encrypted signal data sequence. In other embodiments however the encrypted signal information can include any number of sub-samples, each including a separate part of the transmitted data sequence. The overall number of chips included in the encrypted signal information, i.e. the total number of chips in the signal sample including any sub-samples, can be selected based on a minimum signal to noise ratio (SNR) of the encrypted signal, the required rate of authentication and the probability of a false alarm. For example, suitable values may be as follows:

Minimum received $C/N_o$ ($C/N_o$min): 44 decibel-hertz (dBHz)
Rate of Authentication: 1 per second
Probability of false alarm: 0.1%

The $C/N_o$ is the signal carrier to unit noise ratio. Hence if the correlation was performed over a full one-second period the SNR would be the same as the $C/N_o$ i.e. 1 Hz integration bandwidth.

In the present embodiment a chip rate of 2.557 million chips (Mchips) per second is used for the encrypted PRS signals. If, for example, 1023 chips are integrated the SNR would be:

$$SNR = C/No min + 10 \log(\text{No of chips integrated}/\text{No of chips per second})$$

$$SNR = 44 + 10 \log(1023/2.557*10^6) = 10 \text{ dB}$$

As described above, a correlation threshold can be preset, such that if the threshold is exceeded then the encrypted signal and the unencrypted signal are considered to be authentic. In practice, noise in the received encrypted signal can result in a probability that the threshold is not exceeded even when the authentic signal is present, i.e. a false negative. Similarly, there is a finite probability that noise can give rise to a false alarm due to the noise exceeding the correlation threshold when there is no signal present, i.e. a false positive. It can be assumed that the noise is Gaussian, since the primary noise source is thermal noise at the front end of the receiver. Furthermore, given that the Gaussian noise distribution is symmetric, if the signal level is normalised and the desired probability of a false positive is the same as a false negative, the signal is 1 and the correlation threshold is 0.5. However, in other embodiments a different correlation threshold can be chosen if required, to provide different relative probabilities of false negatives/positives occurring.

Using the parameters of the present example, a false alarm rate of 1 every 20 seconds is obtained for a signal sample length of 1023 chips, SNR of 10 dB, and assuming authentication is performed once every second. Similarly, a signal sample length of 2046 chips and SNR of 13 dB gives a false alarm rate of 1 every 1.5 minutes, and a signal sample length of 4092 chips and SNR of 16 dB gives a false alarm rate of 1 every 20 minutes. In any given embodiment, an overall signal sample length can be selected to give an acceptable false alarm rate.

Figure 3A:
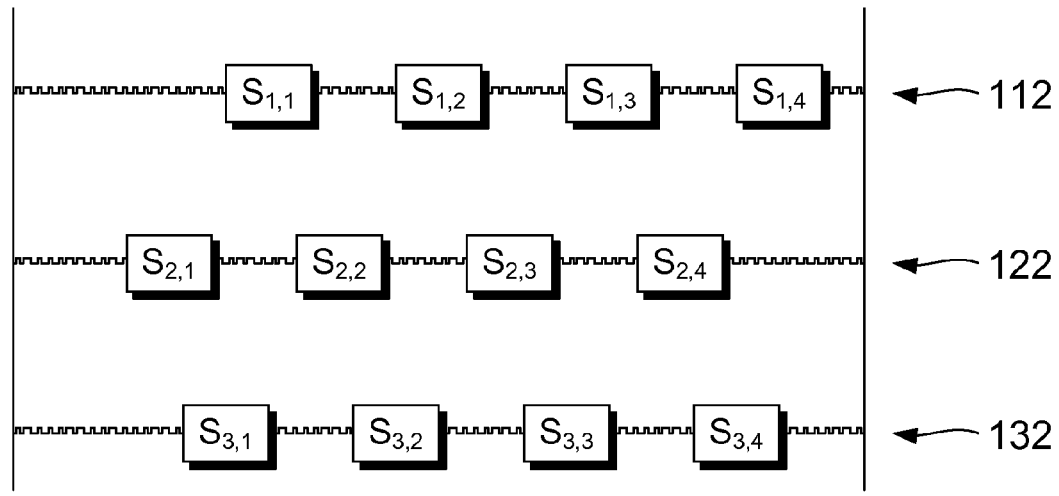
FIGS. 3A and 3B illustrate signal samples extracted from a plurality of encrypted signals, according to an embodiment of the present invention.
Figure 3B:
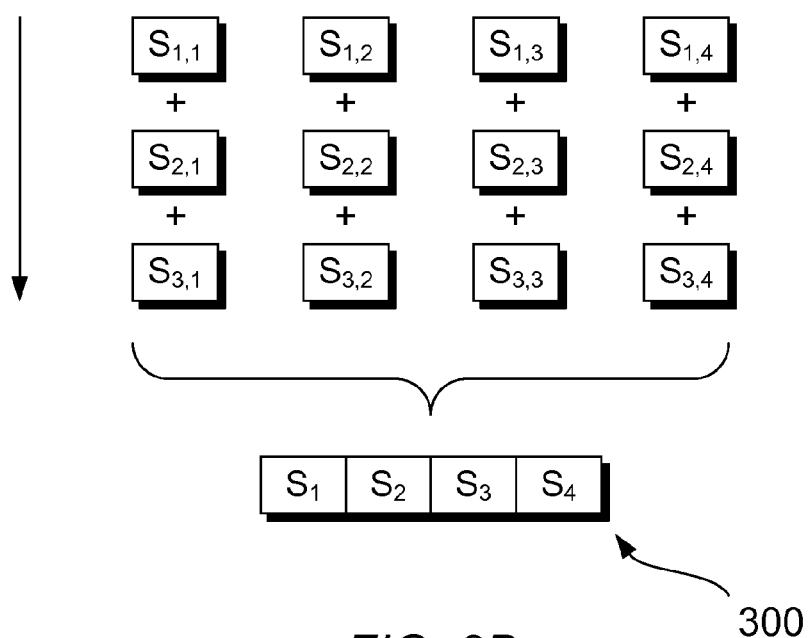

Referring now to FIGS. 3A and 3B, signal samples extracted from a plurality of encrypted signals are illustrated according to an embodiment of the present invention. The embodiment is similar to that of FIG. 2, except that the encrypted signal information includes a plurality of signal samples each extracted from a different one of the encrypted signals shown in FIG. 1, each one of the encrypted signals 112, 122, 132 being transmitted by a different one of the satellites 110, 120, 130. Furthermore, the signal sample for each encrypted signal includes a plurality of sub-samples. Specifically, the encrypted signal information includes a first signal sample extracted from the first encrypted signal 112 including four sub-samples $S_{1,1}$, $S_{1,2}$, $S_{1,3}$ and $S_{1,4}$. The encrypted signal information also includes a second signal sample extracted from the second encrypted signal 122 including four sub-samples $S_{2,1}$, $S_{2,2}$, $S_{2,3}$ and $S_{2,4}$, and a third signal sample extracted from the third encrypted signal 132 including four sub-samples $S_{3,1}$, $S_{3,2}$, $S_{3,3}$ and $S_{3,4}$. To transmit signal samples for a plurality of different encrypted signals as the encrypted signal information 300, the signal samples, or sub-samples if present, from the different encrypted signals 112, 122, 132 are summed as shown in FIG. 3B. For example, in the present embodiment if the first chips in the first sub-samples $S_{1,1}$, $S_{2,1}$ and $S_{3,1}$ have values of +1, +1 and −1 respectively, the first chip of the summed sub-sample $S_1$ will have a value of +1.

Summing the samples, or sub-samples, in this way reduces the total amount of data to be sent to the receiver as the encrypted signal information 300. The receiver can then perform the correlation by correlating the summed signal sample 300 directly with the corresponding portion(s) of the received encrypted signal. The contribution of signal samples from other satellites, i.e. satellites other than the one which transmitted the encrypted signal received by the receiver, will average out to zero and a correlation peak will still be obtained if the encrypted signal matches one of the signal samples included in the encrypted signal information 300.

As shown in FIG. 3A, the sub-samples include parts of the data sequence that are separated in time, such that data sequence is discontinuous between consecutive sub-samples. The use of sub-samples allows a relatively large number of chips to be included in the signal sample as a whole, whilst preserving security since only small discrete portions of the sequence are transmitted. Therefore a third party cannot reconstruct the entire encrypted signal from the sub-samples, which could enable the security keys to be obtained through brute-force by guessing possible PRNs.

Additionally, in embodiments of the present invention in which sub-samples are used, an upper limit can be placed on the sub-sample length to guarantee that the signal sample is secure and that the PRN sequence or the data of the encrypted signal cannot be established. Specifically, if the encrypted signal information includes signal samples for a number M of satellites, the maximum sub-sample length N in chips can be given by:

$$N(\text{in chips}) = M - 1$$

Therefore in general, for maximum security the sub-sample length can be chosen to be less than or equal to one less than the number of satellites for which signal samples are provided. Accordingly, longer sub-samples can be used if information about more satellites is provided. However, in embodiments where the encrypted signal includes PRN bits modulated by a data bit, as described above with reference to the PRS signals in the Galileo GNSS, the maximum length of a sub-sample can be doubled if the sub-sample includes a data transition. In this case, the maximum sub-sample length N when a data transition is included is given by:

$$N(\text{in chips}) = 2(M-1)$$

Therefore in general, if a data transition is included the sub-sample length can be chosen to be less than or equal to $2(M-1)$. These limits ensure that neither the PRN nor the data can be derived from a signal sample, even if one or the other is known. Hence information about the encrypted signals can be made publicly available for use by the receiver without compromising the security of the encrypted signals. The above-mentioned limits can nevertheless be exceeded in embodiments where maximum security is not a priority or provided by other means, e.g. a secure encrypted communications channel.

Figure 4:
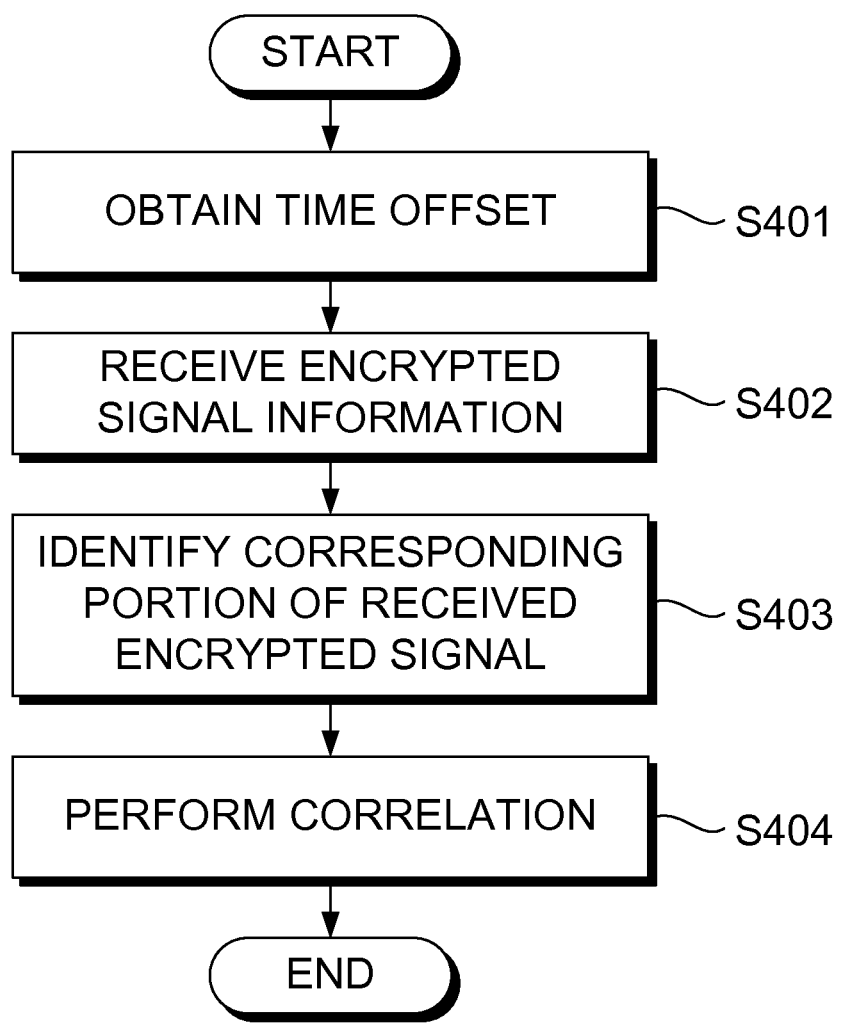
FIG. 4 illustrates a method for authenticating an unencrypted signal at a GNSS receiver, according to an embodiment of the present invention.

Referring now to FIG. 4, a method for authenticating an unencrypted signal at a GNSS receiver is illustrated, according to an embodiment of the present invention. Aspects of the method have already been described above and as such will not be discussed in detail here. The method can be used in any GNSS receiver capable of receiving unencrypted and encrypted GNSS signals, and can be executed by dedicated hardware or by a software program executed on a processor. First, in step S401 the receiver receives unencrypted positioning signals and obtains a time offset based on these unencrypted signals. Then, in step S403, the receiver receives the encrypted signal information. In other embodiments, the encrypted signal information can be received before receiving the unencrypted signals and/or before obtaining the time offset.

Next, in step S403 the receiver identifies a portion of an encrypted signal that has been received and recorded, which is expected to correspond to the data included in the signal sample in the encrypted signal information. As described above, the portion can be identified based on the obtained time offset and the information included in the encrypted signal information about when the data in the signal sample was transmitted. Then, in step S404, the receiver correlates the identified portion with the signal sample. If a correlation value above a predetermined threshold is obtained, it is determined that the encrypted signal, and hence the unencrypted signal received from the same satellite, e.g. in the same frequency band for Galileo or GPS, is also authentic.

In a preferred embodiment, the signal sample is provided without being modulated according to the modulation scheme of the encrypted signal. For example, in Galileo the encrypted PRS signal is transmitted using BOC modulation, but the signal sample can be provided without BOC modulation. In such embodiments, in step S404 the receiver should be arranged to apply the appropriate modulation before correlating the portion of the recorded encrypted signal with the signal sample. Providing the signal sample without modulation reduces the amount of data that has to be sent to the receiver, and therefore reduces the bandwidth required to transfer the encrypted signal information. However, in other embodiments the signal sample could be provided with modulation, in which case the receiver could simply correlate the received signal sample directly with the identified portion of the received encrypted signal.

Figure 5:
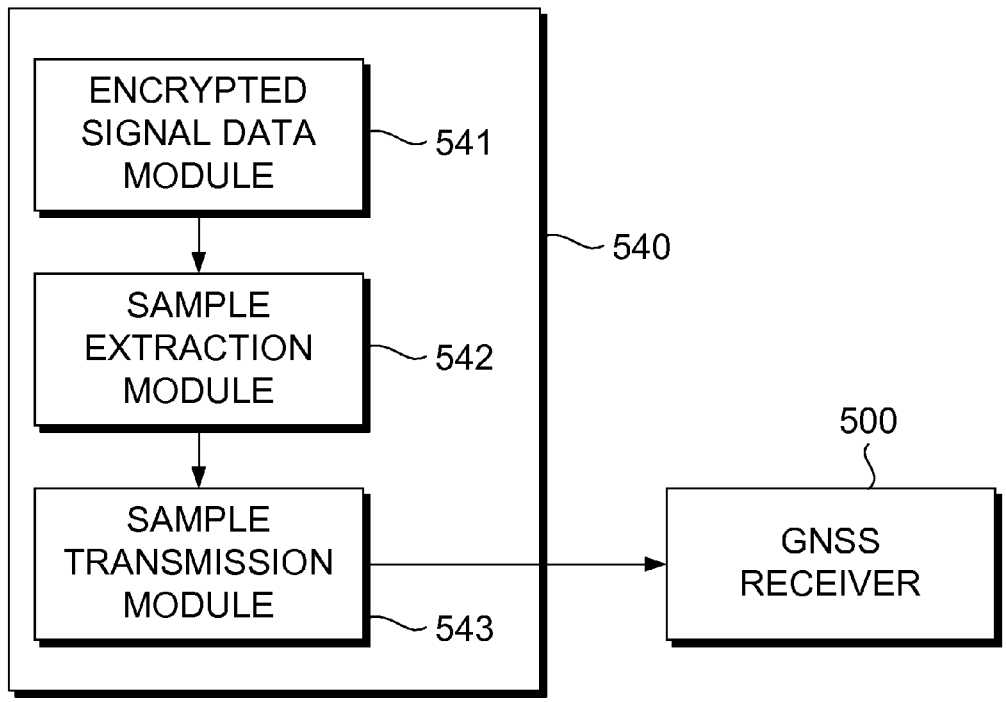
FIG. 5 illustrates apparatus for providing encrypted signal information about an encrypted signal to a GNSS receiver, according to an embodiment of the present invention.

Referring now to FIG. 5, apparatus for providing encrypted signal information about an encrypted signal to a GNSS receiver is illustrated, according to an embodiment of the present invention. The encrypted signal information is provided for use in authenticating an unencrypted signal at the receiver. The apparatus 540 includes an encrypted signal data module 541 arranged to obtain a data sequence of the encrypted signal as-transmitted. The encrypted signal data module 541 can comprise any means for obtaining the data sequence. In the present embodiment the encrypted signal data module 541 is provided with access to the original encrypted PRN codes and data used by the satellite to generate the encrypted signal chips. However, in other embodiments other approaches are possible, for example the encrypted signal data module could comprise a large antenna arranged to directly detect the encrypted signal transmitted by the satellite.

The apparatus 540 further comprises a sample extraction module 542 arranged to extract a signal sample from the data sequence, the signal sample including a part of the data sequence having a length less than a total length of the data sequence. Various arrangements are possible. For example, the sample extraction module 542 can extract a single signal sample as shown in FIG. 2, or can extract different parts of the data sequence to be provided as sub-samples in the signal sample. Also, the sample extraction module 542 can extract a signal sample from one encrypted signal, or can extract signal samples from a plurality of different encrypted signals to provide encrypted signal information for different satellites. The sample extraction module 542 is also arranged to obtain information about the time at which the data in each signal sample was transmitted, based on the data sequence received from the encrypted signal data module 541.

Also, the apparatus 540 comprises a sample transmission module 543 arranged to transmit the signal sample and information about when the data included in the signal sample was transmitted by the satellite, as the encrypted signal information, to a GNSS receiver 500. For example, the sample transmission module 543 can be arranged to communicate with the receiver 500 over a mobile communications network and/or via the Internet, and can transmit the encrypted signal information automatically at predetermined intervals, or in response to a request from the receiver 500 when the receiver 500 needs to perform authentication.

Figure 6:
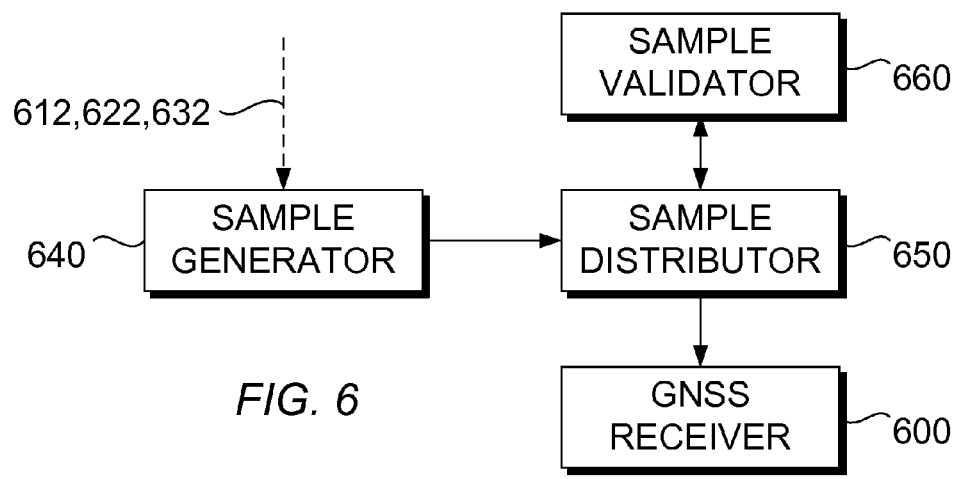
FIG. 6 illustrates a system for generating and validating encrypted signal information and providing the validated information to a GNSS receiver, according to an embodiment of the present invention.

Referring now to FIG. 6, a system for generating and validating encrypted signal information and providing the validated information to a GNSS receiver is illustrated, according to an embodiment of the present invention. The system includes a sample generator 640 and receiver 600 similar to the apparatus 540 and receiver of 500, except that in the present embodiment the sample generator 640 is arranged to obtain the encrypted signal data sequence by directly detecting encrypted signals 612, 622, 632 transmitted by satellites in the GNSS.

In the present embodiment, after the encrypted signal information has been obtained by the sample generator 640, the encrypted signal information is sent to a sample distributor 650 which in turn forwards the encrypted signal information to a sample validator 660. The sample validator 660 is arranged to validate the received encrypted signal information by detecting the transmitted encrypted signal, identifying a portion of the detected encrypted signal corresponding to the signal sample, correlating the identified portion of the detected encrypted signal with the signal sample, and validating the encrypted signal information if a predetermined threshold correlation is obtained. That is, the sample validator 660 performs a method similar to that used at the receiver 600, except that the sample validator 660 is also able to decrypt the encrypted signal to verify that the encrypted signal used for correlation is itself authentic. The sample validator 660 informs the sample distributor 650 of the validation result, and if the encrypted signal information was successfully validated then the sample distributor proceeds to provide the validated encrypted signal information to the receiver 600. On the other hand, if the encrypted signal information was not validated, then it is not provided to the receiver 600. Validation in this way can ensure the integrity of the authentication mechanism.

Figure 7:
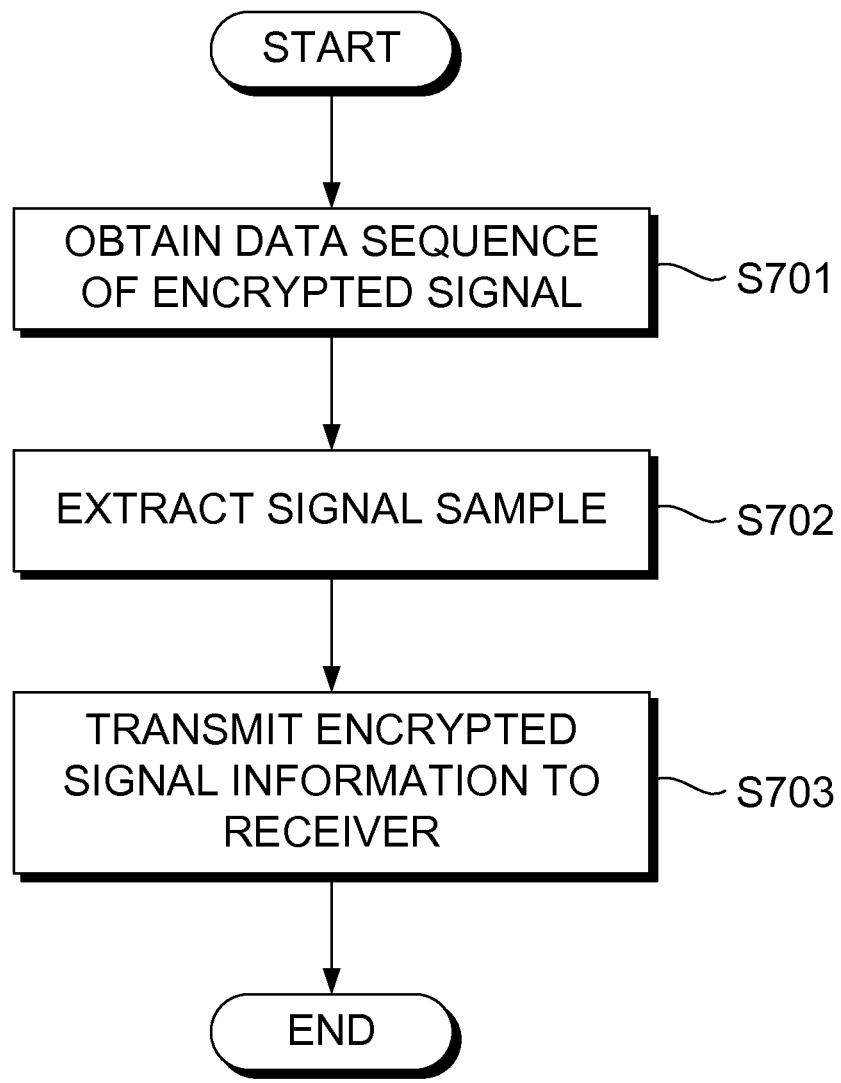
FIG. 7 illustrates a method for providing encrypted signal information about an encrypted signal to a GNSS receiver, according to an embodiment of the present invention.

Referring now to FIG. 7, a method for providing encrypted signal information about an encrypted signal to a GNSS receiver is illustrated, according to an embodiment of the present invention. Aspects of the method have already been described above in relation to FIG. 5 and as such will not be discussed in detail here. The method can be executed by dedicated hardware or by a software program executed on a processor.

First, in step S701, a data sequence as transmitted in an encrypted signal is obtained. Next, in step S702, a signal sample is extracted from the data sequence. As described above, the signal sample may or may not include a plurality of sub-samples, and one or more signal samples for different satellites can be extracted. Then, in step S703, the signal sample is transmitted to a GNSS receiver together with information about when the data included in the signal sample was transmitted by the satellite, as the encrypted signal information.

Figure 8:
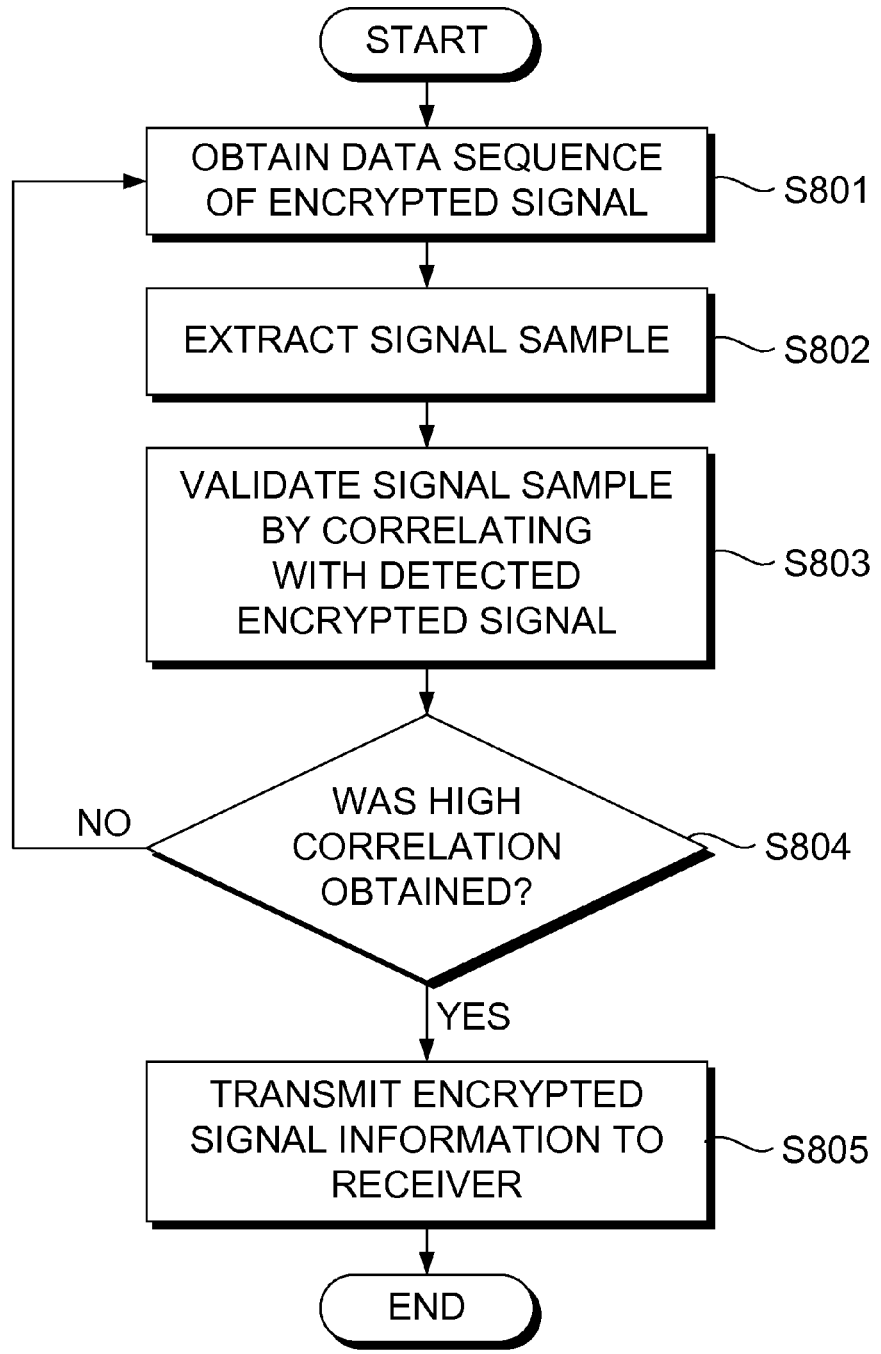
FIG. 8 illustrates a method for generating and validating encrypted signal information and providing the validated information to a GNSS receiver, according to an embodiment of the present invention.

Referring now to FIG. 8, a method for generating and validating encrypted signal information and providing the validated information to a GNSS receiver is illustrated, according to an embodiment of the present invention. Aspects of the method have already been described above in relation to FIG. 6 and as such will not be discussed in detail here. The method can be executed by dedicated hardware or by a software program executed on a processor.

Steps S801 and S802 are the same as steps S701 and S702, respectively, of FIG. 7. In the present embodiment however, after the signal sample is extracted, the signal sample is validated in step S803 by correlating with a detected encrypted signal, based on information about the time at which the data included in the signal sample was transmitted. Validation has been described above with respect to the sample validator 660 of FIG. 6. Then, in step S804, it is checked whether a high correlation result was obtained. If the correlation result was low, i.e. below a predetermined threshold, it is determined that the signal sample is not suitable for use in authenticating an unencrypted signal, and the method returns to the beginning. On the other hand, if the threshold correlation was obtained, i.e. met or exceeded, then it is determined that the signal sample has been successfully validated and the encrypted signal information including the signal sample is transmitted to the receiver at step S805.

Whilst certain embodiments of the present invention have been described above, the skilled person will understand that many variations and modifications are possible without departing from the scope of the invention as defined in the accompanying claims.

The invention claimed is:

1. A method for providing encrypted signal information about a plurality of encrypted signals transmitted by a plurality of satellites in a satellite navigation system, the method comprising:

obtaining a sequence of chips of each one of the plurality of encrypted signals as transmitted, each one of the encrypted signals being transmitted by a different satellite in the satellite navigation system;

extracting sub-sample from each one of the obtained sequences of chips, each of the extracted sub-samples including a part of the respective sequence having a length less than a total length of the sequence;

summing the plurality of sub-samples into a summed signal sample; and transmitting, to a receiver for use in the satellite navigation system, the summed signal sample and information about when the chips included in the summed signal sample were transmitted by the satellites, as the encrypted signal information.

2. The method of claim 1, wherein the encrypted signal information includes information about encrypted signal chips transmitted by M satellites in the satellite navigation system, and wherein the number of chips N included in one of the sub-samples is given by $N \leq M-1$.

3. The method of claim 2, wherein the sequence of chips is a pseudorandom number PRN sequence modulated by a data bit, and wherein if one of the sub-samples includes a data bit transition, the length N of said sub-sample in chips is given by $N \leq 2(M-1)$.

4. The method of claim 3, further comprising:

validating each signal sample before transmitting to the receiver, by detecting the transmitted encrypted signal, identifying a portion of the detected encrypted signal corresponding to the signal sample, correlating the identified portion of the detected encrypted signal with the signal sample, and validating the signal sample if a predetermined threshold correlation is obtained and transmitting the signal sample if the validation is successful.

5. The method of claim 1, wherein the sequence of chips of the encrypted signal is obtained based on information about pseudorandom number PRN codes and data used by the satellite to generate the encrypted signal.

6. The method of claim 1, further comprising:

validating each signal sample before transmitting to the receiver, by detecting the transmitted encrypted signal, identifying a portion of the detected encrypted signal corresponding to the signal sample, correlating the identified portion of the detected encrypted signal with the signal sample, and validating the signal sample if a predetermined threshold correlation is obtained, and transmitting the signal sample if the validation is successful.

7. The method of claim 1, wherein the sequence of chips of the encrypted signal is obtained by directly detecting the encrypted signal transmitted by the satellite.

8. A method for authenticating an unencrypted signal at a receiver arranged to receive the unencrypted signal and an encrypted signal from a satellite in a satellite navigation system, the method comprising:

obtaining a time offset between an internal clock of the receiver and an internal clock of the satellite based on the unencrypted signal;

receiving encrypted signal information about the encrypted signal, the encrypted signal information including a signal sample and information about when chips included in the signal sample was transmitted by the satellite, the signal sample comprising a concatenated plurality of sub-samples each including a separate part of a sequence of chips as transmitted in the encrypted signal such that the sequence is discontinuous between consecutive ones of the plurality of sub-samples;

identifying a portion of the received encrypted signal expected to correspond to the signal sample based on the obtained time offset;

correlating the identified portion with the signal sample by performing integration across the concatenated plurality of sub-samples to obtain a single correlation result for the plurality of sub-samples; and determining that the received unencrypted signal is authentic if the obtained single correlation result exceeds a predetermined threshold correlation.

9. The method of claim 8, wherein the encrypted and unencrypted signals are received at the same frequency, and are phase-locked.

10. The method of claim 9, wherein the received encrypted signal is modulated according to a Binary Offset Carrier BOC modulation scheme, the method further comprising:

applying the BOC modulation to the signal sample, wherein correlating the identified portion with the signal sample comprises correlating the identified portion with the BOC modulated signal sample.

11. The method of claim 8, wherein the received encrypted signal is modulated according to a Binary Offset Carrier BOC modulation scheme, the method further comprising:

applying the BOC modulation to the signal sample, wherein correlating the identified portion with the signal sample comprises correlating the identified portion with the BOC modulated signal sample.

12. A non-transitory computer-readable storage medium arranged to store a computer program which, when executed, performs the method of claim 8.

13. Apparatus for providing encrypted signal information about a plurality of encrypted signals transmitted by a plurality of satellites in a satellite navigation system, the apparatus comprising:

a first processor configured to obtain a sequence of chips of each one of the plurality of encrypted signals as transmitted, each one of the encrypted signals being transmitted by a different satellite in the satellite navigation system, extract a sub-sample from each one of the obtained sequences of chips, each of the extracted sub-samples including a part of the respective sequence having a length less than a total length of the sequence the plurality of sub-samples extracted from the obtained sequences of chips into a summed signal sample; and a network interface for transmitting, to a receiver for use in the satellite navigation system, the summed signal sample and information about when the chips included in the summed signal sample were transmitted by the plurality of satellites, as the encrypted signal information.

14. A system comprising the apparatus of claim 13, and a receiver arranged to receive an unencrypted signal and an encrypted signal from a satellite in a satellite navigation system, the receiver comprising:

a second processor configured to obtain a time offset between an internal clock of the receiver and an internal clock of the satellite based on the unencrypted signal; and a network interface for receiving encrypted signal information about the encrypted signal, the encrypted signal information including a signal sample and information about when chips included in the signal sample were transmitted by the satellite, the signal sample comprising a concatenated plurality of sub-samples each including a separate part of a sequence of chips as transmitted in the encrypted signal such that the sequence is discontinuous between consecutive ones of the plurality of sub-samples wherein the second processor is further configured to determine whether the received unencrypted signal is authentic, said second processor being arranged to identify a portion of the received encrypted signal expected to correspond to the signal sample based on the obtained time offset, correlate the identified portion with the signal sample comprising the concatenated plurality of sub-samples, and determine that the received unencrypted signal is authentic if a predetermined threshold correlation is obtained.

15. A receiver arranged to receive an unencrypted signal and an encrypted signal from a satellite in a satellite navigation system, the receiver comprising:

a processor configured to obtain a time offset between an internal clock of the receiver and an internal clock of the satellite based on the unencrypted signal; and a network interface for receiving encrypted signal information about the encrypted signal, the encrypted signal information including a signal sample and information about when chips included in the signal sample were transmitted by the satellite, the signal sample comprising a concatenated plurality of sub-samples each including a separate part of a sequence of chips as transmitted in the encrypted signal such that the sequence is discontinuous between consecutive ones of the plurality of sub-samples wherein the processor is further configured to determine whether the received unencrypted signal is authentic, said processor being arranged to identify a portion of the received encrypted signal expected to correspond to the signal sample based on the obtained time offset, correlate the identified portion with the signal sample by performing integration across the concatenated plurality of sub-samples to obtain a single correlation result for the plurality of sub-samples, and determine that the received unencrypted signal is authentic if the obtained single correlation result exceeds a predetermined threshold correlation.

16. A method for authenticating an unencrypted signal at a receiver arranged to receive a plurality of unencrypted signals and a plurality of encrypted signals from a plurality of satellites in a satellite navigation system, the method comprising:

obtaining a time offset between an internal clock of the receiver and an internal clock of one of the plurality of satellites based on the unencrypted signal received from said one of the plurality of satellites;

receiving encrypted signal information about the plurality of encrypted signals, the encrypted signal information including a summed signal sample and information about when chips included in the summed signal sample were transmitted by said one of the plurality of satellites, the signal sample comprising a plurality of sub-samples each extracted from a sequence of chips of one of the plurality of encrypted signals as transmitted, each sub-sample including a part of the respective sequence having a length less than a total length of the sequence;

identifying a portion of the encrypted signal eceived from said one of the plurality of satellites expected to correspond to the signal sample based on the obtained time offset;

correlating the identified portion with the summed signal sample by performing integration to obtain a single correlation result for the summed signal sample; and determining that the received unencrypted signal is authentic if the obtained single correlation result exceeds a predetermined threshold correlation.

17. A receiver arranged to receive a plurality of unencrypted signals and a plurality of encrypted signals from a plurality of satellites in a satellite navigation system, the receiver comprising:

a processor configured to obtain a time offset between an internal clock of the receiver and an internal clock of one of the plurality of satellites based on the unencrypted signal received from said one of the plurality of satellites; and a network interface configured to receive encrypted signal information about the plurality of encrypted signals, the encrypted signal information including a summed signal sample and information about when chips included in the summed signal sample were transmitted by said one of the plurality of satellites, the signal sample comprising a plurality of sub-samples each extracted from a sequence of chips of one of the plurality of encrypted signals as transmitted, each sub-sample including a part of the respective sequence having a length less than a totalength of the sequence; and wherein the processor is further configured to determine whether the received unencrypted signal s authentic, said processor being arranged to identify a portion of the received encrypted signal expected to correspond to the signal sample based on the obtained time offset, correlate the identified portion with the signal sample, and determine that the received unencrypted signal is authentic if a predetermined threshold correlation is obtained.

* * * * *